US006450401B1

(12) United States Patent
Hirota et al.

(10) Patent No.: US 6,450,401 B1
(45) Date of Patent: Sep. 17, 2002

(54) WRITING BOARD WITH ELECTRONIC CALCULATOR

(75) Inventors: Kashichi Hirota, Hachioji; Makoto Kaneda, Saitama-ken, both of (JP)

(73) Assignee: Kyowa Electric and Chemical Co., Ltd., Tokyo (JP)

(*) Notice: Subject to any disclaimer, the term of this patent is extended or adjusted under 35 U.S.C. 154(b) by 58 days.

(21) Appl. No.: 09/634,854

(22) Filed: Aug. 8, 2000

(30) Foreign Application Priority Data

Aug. 17, 1999 (JP) .......................................... 11-230219

(51) Int. Cl.[7] ............................................... G06K 19/06
(52) U.S. Cl. .................................. 235/61 R; 235/59 R
(58) Field of Search ............................ 235/61 R, 58 R, 235/59 R, 449, 493; 273/239, 240, 241; 434/409, 408, 411, 412

(56) References Cited

U.S. PATENT DOCUMENTS 4,143,472 A * 3/1979 Murata et al. .............. 434/409
5,179,502 A * 1/1993 Matsuda ..................... 361/392
5,820,385 A * 10/1998 Ohashi et al. .............. 434/409
5,949,050 A * 9/1999 Fosbenner et al. .......... 235/449
6,231,225 B1 * 5/2001 Bedol .................... 464/705.02
6,315,573 B1 * 11/2001 Hirota et al. ............... 434/409

FOREIGN PATENT DOCUMENTS

JP 58-194083 12/1983

* cited by examiner

*Primary Examiner*—Michael G. Lee
*Assistant Examiner*—Daniel St.Cyr
(74) *Attorney, Agent, or Firm*—Jacobson Holman, PLLC

(57) ABSTRACT

A writing board with an electronic calculator and a writing board to which an electronic calculator is installable. The writing board including a case member provided with an opening in a top surface of the case member, and a frame section surrounding the opening is formed on the top surface of the case member. A recording sheet including a micro-capsule magnetic sheet is disposed in the case member with a top face of the recording sheet exposed through the opening of the case member. A magnetic member is used for writing on the recording sheet. The writing board further includes a magnetized erasing sheet which is positioned under the recording sheet in parallel with the recording sheet. An erasing button is used in the case member so that writings on the recording sheet can be erased only by depressing the erasing button. An electronic calculator is or can be mounted on the top surface of the case member.

7 Claims, 7 Drawing Sheets

WRITING BOARD WITH ELECTRONIC CALCULATOR

FIELD OF THE INVENTION

The present invention relates to a writing board to which an electronic calculator is associated and to a writing board to which an electronic calculator can be mounted.

BACKGROUND OF THE INVENTION

In business situations, such as business negotiations, it is frequently necessary to take note of information from opposite party and to calculate with an electronic calculator. Thus, it is desired to provide an electronic calculator in association with a writing board. A typical example for aiming to achieve this object can be found in a memo pad case with an electronic calculator such as that described in Japanese Utility Model Laid-Open Publication No. Sho 58-194083, wherein a memo pad, a writing instrument such as a pencil or a mechanical pencil, and an electronic calculator are integrated with a case.

Meanwhile, there is known a writing board in which a microcapsule magnetic sheet is applied as a recording sheet. In this writing board, any characters and figures can be magnetically written on a top face of the recording sheet with a magnetic pen having a tip made of a magnetic material, and the characters and figures written on the top face of the recording sheet can also be erased by an erasing magnetic member which has magnetism and which is disposed adjacent to a back face of the recording sheet.

The theory of the above device will be shortly described as follows. As shown in FIG. 1, in a microcapsule magnetic sheet 10 for use in a recording sheet, microcapsules 11 respectively having about the size of 500 $\mu$m in diameter are two-dimensionally arranged between a top sheet 12 and a back sheet 13. Black magnetic powders 14 having magnetism are dispersed in white emulsion 15 and encapsulated in each microcapsule 11. Thus, when magnets 16, 17 are positioned close to the microcapsule magnet sheet 10, the black magnetic powders 14 in the microcapsule 11 are magnetically attracted so as to present black color on one side of the microcapsule magnet sheet 10 to which the magnets 16, 17 are closely positioned. In contrast, on the other side of the microcapsule magnet sheet 10, white color can be presented due to only presence of the. white emulsion 15. In the writing board applying the microcapsule magnetic sheet as the recording sheet, by utilizing the above theory of magneticphoresis, black color characters or figures can be freely written on the top sheet 12 with the magnet 16. In addition, when the magnet 17 is positioned close to and moved along the back sheet 13 of the microcapsule magnetic sheet 10, the magnetic powders 14 in the microcapsule 11 are attracted along the track of the magnet 17 toward the back sheet 13, so that the characters or figures written on the front sheet 12 can be erased.

The aforementioned writing board provided with an electronic calculator involves the burden of appropriately supplementing a memo pad and a writing instrument and of disposing used memo papers. Further, when it is required to operate the electronic calculator, a user is required to actuate keys of the electronic calculator after putting off a pen from his hand so as not to stain the electronic calculator, hands or the like. Thus, handling is also burdensome.

Thus, it may be appreciated to apply the writing board with the aforementioned microcapsule magnetic sheet as a writing board which is to be combined with an electronic calculator, so as to make it possible to repeatedly write and erase without consuming any memo pad and writing instrument, and without staining the electronic calculator, hands or the like.

However, the conventional microcapsule magnetic sheet type writing board has a problem that a burdensome operation is necessary for erasing writings on the recording sheet. Thus, utilizing this kind of writing board in combination with an electronic calculator does not always provide a device which is convenient to use.

SUMMARY OF THE INVENTION

It is an object of the present invention to solve the aforementioned problems in using a microcapsule magnetic sheet type writing board in combination with an electronic calculator. Another object of the present invention is to provide a novel structure for a writing board with an electronic calculator and a writing board to which an electronic calculator can be mounted. A further object of the present invention is to provide a writing board wherein no supplement of memo pads and writing instruments are required, no operation being required for disposing of used memo papers. A further object of the present invention is to provide a writing board wherein keys of the calculator can be pushed by a finger of a hand holding a pen or by an end or tip of the pen without risk of staining the electronic calculator, hands or the like. Still further object of the present invention is to provide a writing board including a microcapsule magnetic sheet but writings on the sheet can be easily erased.

In order to achieve the above and other objects, a writing board with an electronic calculator according to the present invention, comprises a case member provide with an opening in a top surface of the case member and having a frame section surrounding the opening in the top surface of the case member, a recording sheet which is comprised of a microcapsule magnetic sheet and disposed in the case member with a top face of the recording sheet exposed through the opening of the case member, a magnetic member for writing on the recording sheet, a magnetic erasing sheet which is positioned under the recording sheet in parallel with the recording sheet, an erasing button provided in the case member, and an electronic calculator disposed on the top surface of the case member, wherein the erasing sheet is connected to a driving device powered by a motor, the driving device being adapted to drive the erasing sheet to erase writings on the recording sheet by reciprocating the erasing sheet while maintaining the erasing sheet substantially in parallel with the recording sheet, from a position where the erasing sheet is far enough from the recording sheet so that the magnetic force of erasing sheet may not erase the writings on the recording sheet, to a position where the erasing sheet is close enough to the recording sheet so that the erasing sheet can apply a magnetic influence on the recording sheet to thereby erase writings on the recording sheet, the driving device being provided with a switching device which is associated with the erasing button and adapted to be turned on by depressing the erasing button. The switching device is so constructed that, once it is turned on, it is maintained in on state until the erasing sheet finishes one cycle of reciprocating motion, and to be turned off when the erasing sheet finishes the one cycle of reciprocating motion.

DESCRIPTION OF THE PREFERRED EMBODIMENT

Preferred embodiments of the present invention will be described with reference to the drawings hereinafter.

Figure 1:
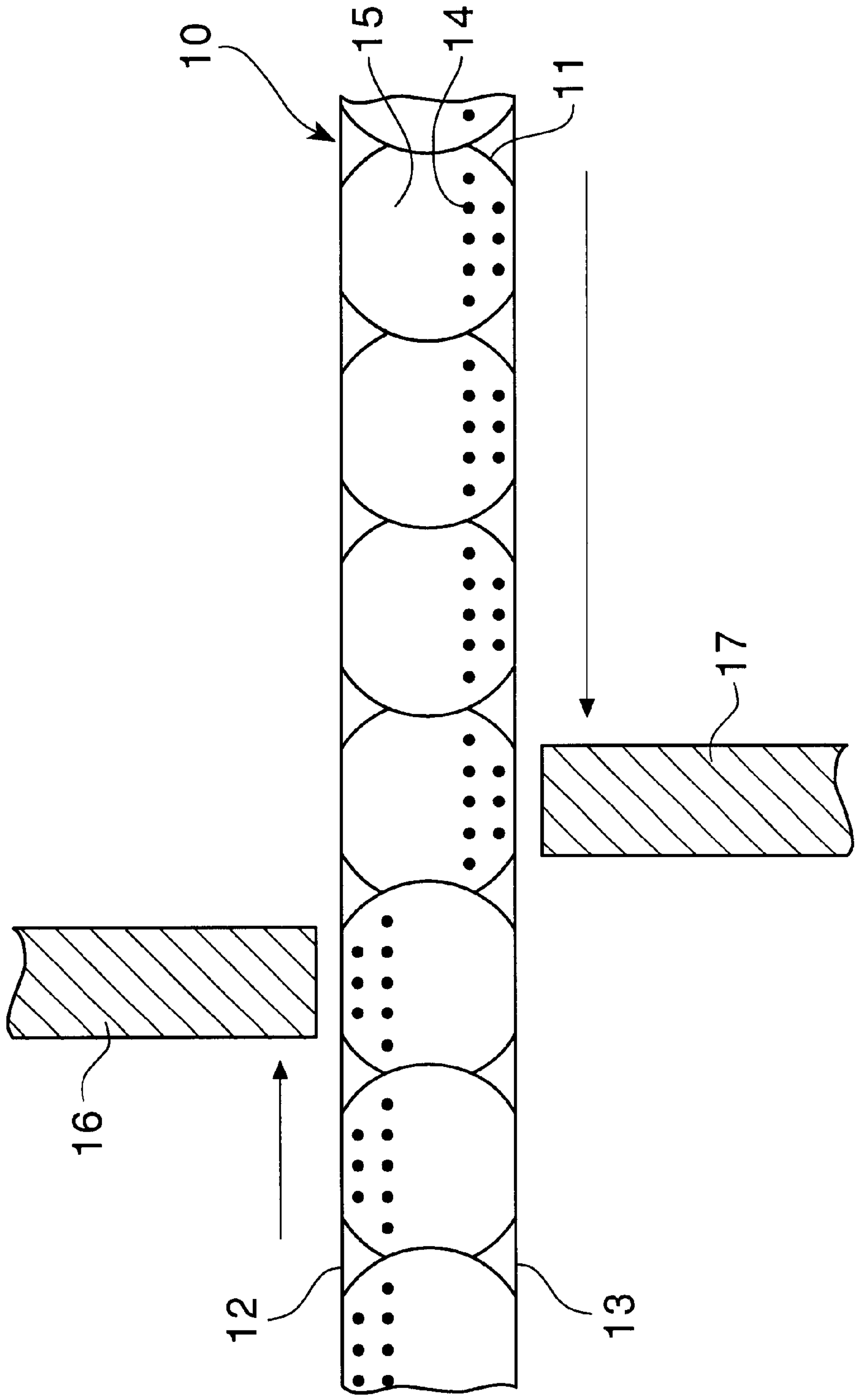
FIG. 1 (PRIOR ART)
FIG. 1 is a side view of a microcapsule magnetic sheet.
Figure 2:
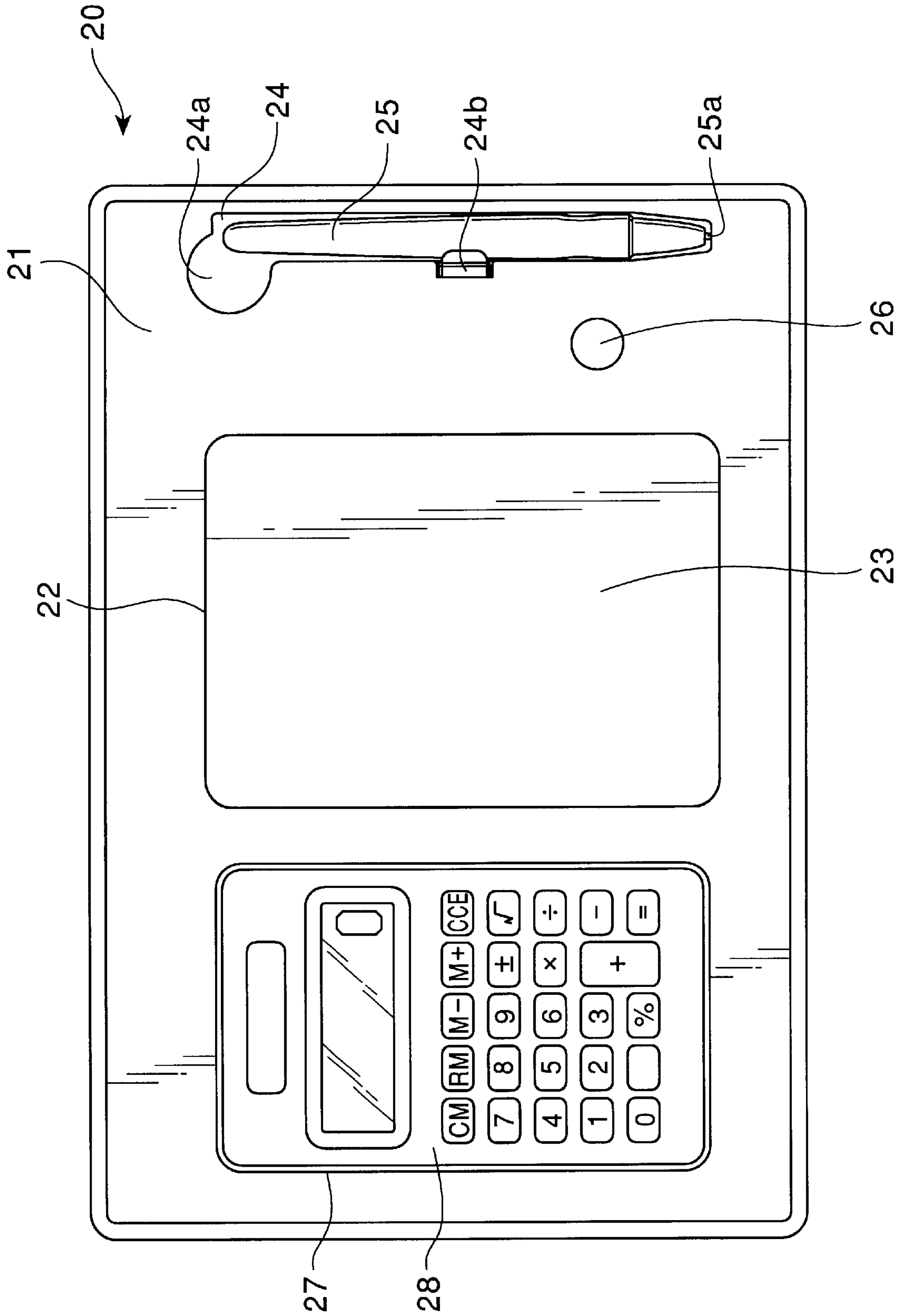
FIG. 2 is a top plan view showing an exterior of one embodiment of a writing board with an electronic calculator according to the present invention.

FIG. 2 is a top plan view showing an exterior of one embodiment of a writing board with an electronic calculator according to the present invention. As shown in FIG. 2, a writing board 20 with an electronic calculator of the present embodiment includes a case member 21 provided with an opening 22 in a top surface of the case member, and a recording sheet 23 which is comprised of the aforementioned microcapsule magnetic sheet and which is disposed in the case member 21 so as to have a top face of the recording sheet 23 exposed through the opening 22 of the top surface of the case member 21.

A pen accommodating recess 24 is provided in the top surface of the case member 21 on the right side region of the recording sheet 23. A magnetic pen 25 whose tip is formed of a magnet 25*a* is accommodated in the pen accommodating recess 24. A left upper edge region of the pen accommodating recess 24 is enlarged form a shape 24*a* larger than that of the magnetic pen 25 so as to make it easy to pick up the magnetic pen 25 accommodated therein. In addition, a pen retaining claw 24*b* is provided on the right center edge region of the pen accommodating recess 24 to lightly hold the magnetic pen 25 accommodated therein from above. Thus, it is possible for a user to pick up the magnetic pen 25 from the pen accommodating recess 24, and magnetically write any characters and figures on the recording sheet 23 with the magnetic pen 25.

An erasing button 26 is provided on the right lower region of the top surface of the case member 21. The writing board with an electronic calculator 20 includes an erasing mechanism which is adapted to allow a user to easily erase the magnetic writings on the recording sheet 23 only by pressing down the erasing button 26.

Figure 4:
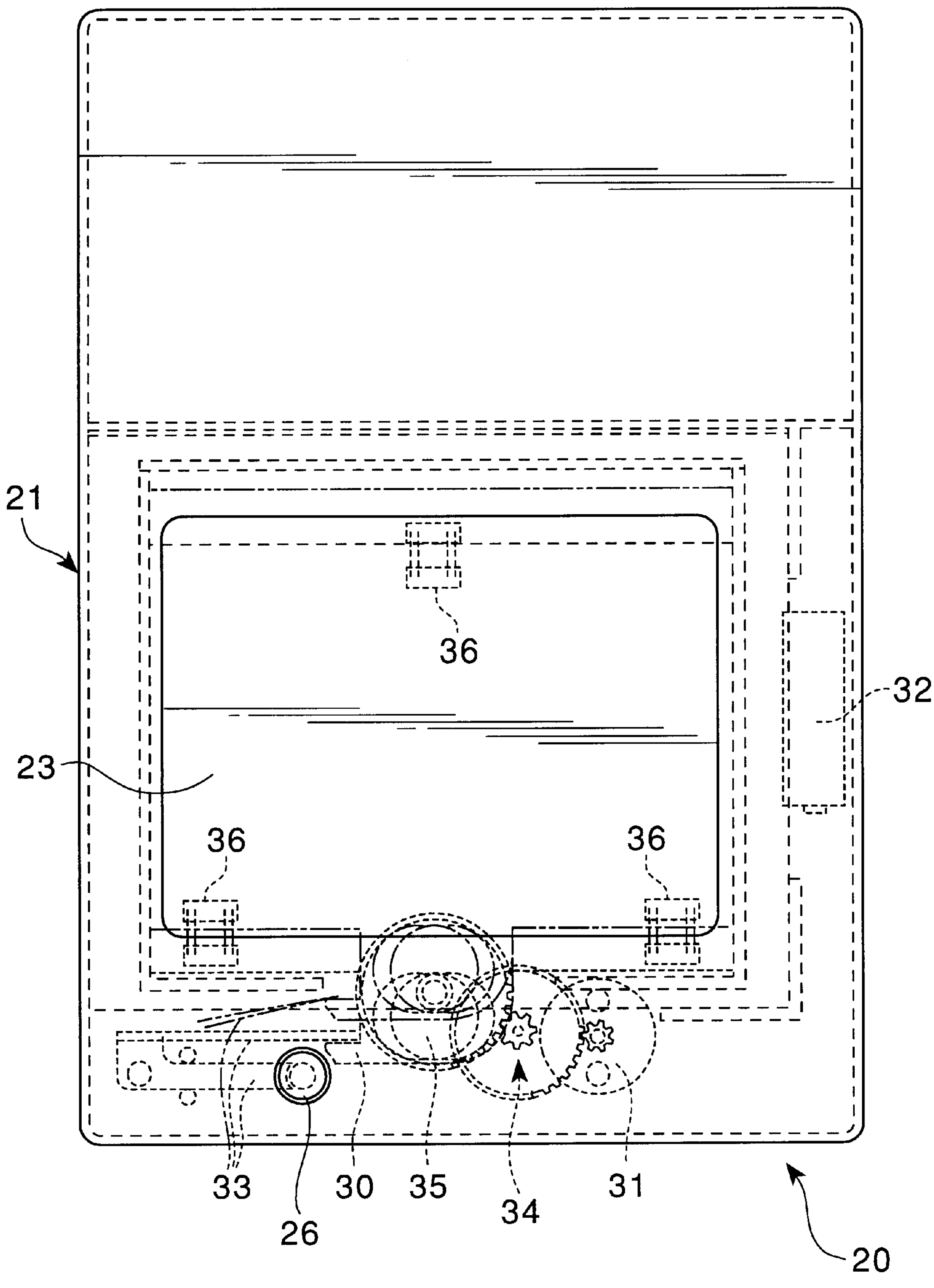
FIG. 4 is a top plan view showing an erasing mechanism of the embodiment shown in FIG. 2.
Figure 5:
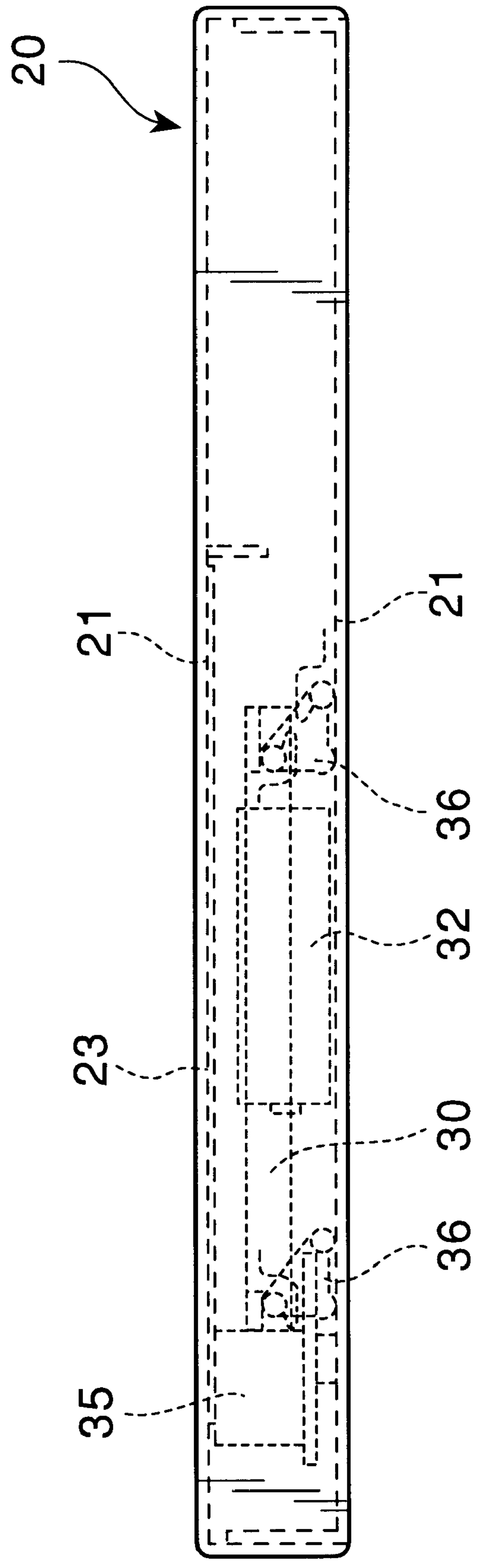
FIG. 5 is a side view showing the erasing mechanism of the embodiment shown in FIG. 2.
Figure 6:
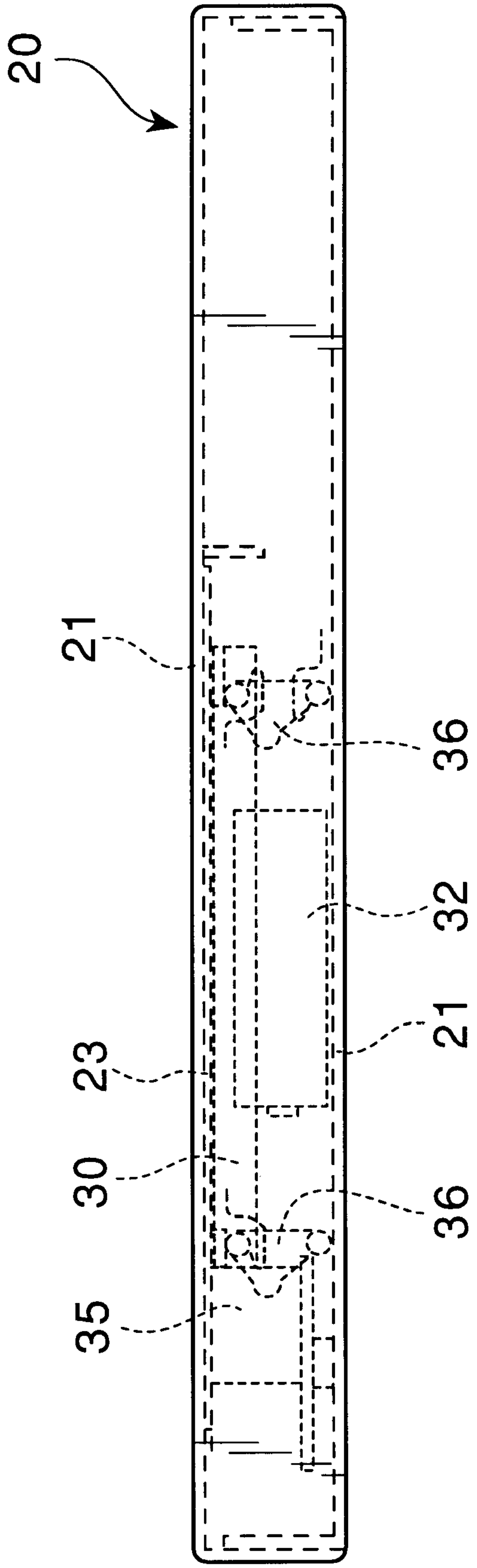
FIG. 6 is a side view showing the erasing mechanism of the embodiment shown in FIG. 2.

FIG. 4 is a top plan view showing an erasing mechanism of the present embodiment. FIG. 5 and FIG. 6 are side views showing the erasing mechanism of the present embodiment. As shown in FIG. 4, FIG. 5 and FIG. 6, the erasing mechanism includes a magnetized erasing sheet, 30 positioned under the recording sheet 23 in parallel with the recording sheet 23, a motor 31, a battery 32, a switch 33, and a driving device 34 which is powered by the motor 31 and connected to the erasing sheet 30. The driving device 34 has an eccentric cam mechanism 35 for creating a planar, parallel movement of the erasing sheet 30. An interlocking device is provided for creating a movement in the erasing sheet 30 to and away from the recording sheet 30 in conjunction with the planar, parallel movement of the erasing sheet 30. The interlocking device 36 comprises a link mechanism 32 which couples the erasing sheet 30 to the case member 21. The link mechanism 36 is swingable in the direction of the parallel movement of the erasing sheet 30. The driving device 34 drives the erasing sheet 30 to erase writings on the recording sheet 23 by reciprocating the erasing sheet 30 maintaining the erasing sheet 30 substantially in parallel with the recording sheet 23, from a position where the erasing sheet 30 is away enough from the recording sheet 23 so that the magnetic force of the erasing sheet 30 may not erase the writings on the recording sheet 23 as shown in FIG. 5, to a position where the erasing sheet 30 is close enough to the recording sheet 23 so that the magnetic force of the erasing sheet 30 affects on and erase the writings on the recording sheet 23. When the erasing button 26 is depressed, the switch 33 is turned on to start supplying an electric power from the battery 32 to the motor 31, the driving unit 30 starts to move the erasing sheet 30. The switch is kept in on state by the erasing sheet 30 which is being moved until the eccentric cam 35 is rotated through 360-degrees, and the erasing sheet 30 finishes one cycle of reciprocating motion. When the erasing sheet 30 finishes one cycle of reciprocating motion, the switch is turned off to automatically stop the motor 31, and one cycle of erasing motion is now completed. In other word, a user can erase writings on the recording sheet 23 in a lump. only by depressing the erasing button 26 on the top surface of the case member 21.

As shown in FIG. 2, the aforementioned magnetically writable and erasable writing board 20 of the present embodiment further includes an electronic calculator accommodating recess 27 disposed on the top surface of the case member and on the left region of the recording sheet 23. An electronic calculator 28 is accommodated in the electronic calculator accommodating recess 27. According to the writing board 20 with the electronic calculator, since the magnetic pen 25 is used as a writing instrument, even if the tip of the pen 25 contacts any object other than the recording sheet 23, it will not be stained. Thus, a user can push keys of the electronic calculator by his finger while holding the pen in hand or even by an end or the tip of the pen.

Figure 3:
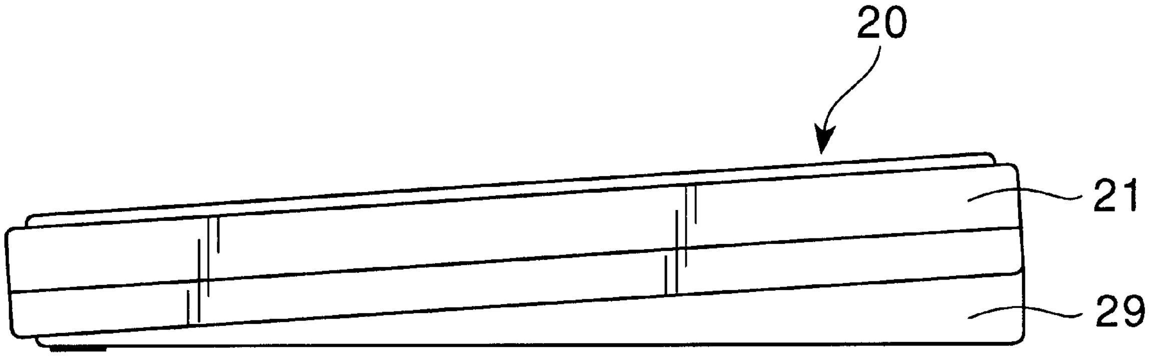
FIG. 3 is a side view of the embodiment shown in FIG. 2.

As shown in the side view of FIG. 3 of the present embodiment, in the writing board 20 of the present embodiment, an wedge shaped mount 29 may be attached to a bottom surface of the writing board 20 so that the entire writing board, which includes the electronic calculator 28 and the recording sheet provided on the top surface of the writing board 20, can be tilted forward. This allows to easily push keys of the electronic calculator 28, to put a display of the electronic calculator 28 in a prominent position, and to easily write on the recording sheet 23. Alternatively, only the top surface of the case member 21 may be tilted forward without attaching the wedge shaped mounting 29. Only the electronic calculator 28 may also be tilted forward by making a bottom surface of the electronic calculator accommodating recess 27 inclined forward. Further, only the recording sheet may be tilted forward.

Figure 7:
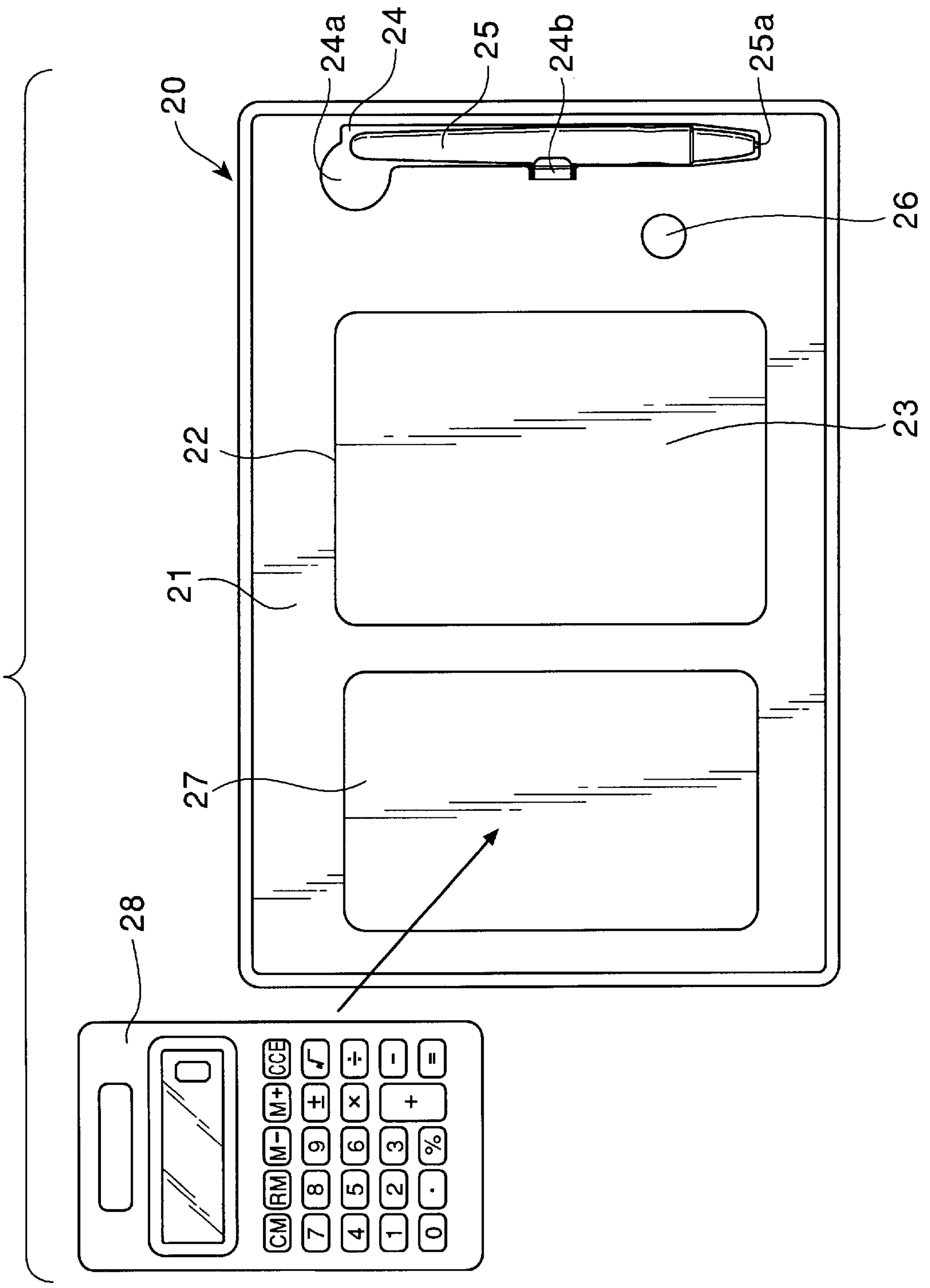
FIG. 7 is a top plan view showing an exterior of one embodiment of a writing board to which an electronic calculator is installable according to the present invention.

FIG. 7 is a top plan view showing an exterior of one embodiment of a writing board to which an electronic calculator is installable according .to the present invention. The parts corresponding to those in the writing board shown in FIG. 2 and FIG. 3 are designated by the same reference numerals as those of FIG. 2 and FIG. 3. In the present embodiment, while an electronic calculator 28 has not been accommodated, the writing board 20 includes an electronic calculator accommodating recess 27 into which the electronic calculator 28 can be mounted. Thus, a user can optionally mount the electronic calculator 28 into the electronic calculator accommodating recess 27.

Thus, in the writing board with an electronic calculator and the writing board to which an electronic calculator is installable, a magnetically writable and erasable writing board is applied so that no supplement of memo papers and writing instruments are required, no operation being required for disposing of used memo papers. Keys of the calculator can be pushed by a finger of a hand holding a pen or even by an end or tip of the pen without staining the electronic calculator, hands or the like. Further, in the writing board with an electronic calculator and the writing board to which an electronic calculator is installable, writings on a recording sheet can easily be erased only by depressing the erasing button.

What is claimed is:

1. A writing board with an electronic calculator comprising:

a case member including a frame defining an opening in a top surface of said case member;

a recording sheet including a microcapsule magnetic sheet disposed in said case member with a top face of said recording sheet exposed through said opening of said case member;

a magnetized member for writing on said recording sheet;

a magnetized erasing sheet positioned under said recording sheet in parallel with said recording sheet;

an erasing button provided in said case member;

an electronic calculator disposed on said top surface of said case member;

a driving device powered by a motor and connected to said erasing sheet;

said driving device being adapted to drive said erasing sheet to produce a reciprocating movement in said erasing sheet maintaining said erasing sheet substantially in parallel with said recording sheet, from a first position wherein said erasing sheet is away from said recording sheet so that said erasing sheet does not magnetically affect and erase writings on said recording sheet, to a second position wherein said erasing sheet is close enough to said recording sheet so that said erasing sheet magnetically affects to erase the writings on said recording sheet, said driving device being provided with a switching device which is adapted to be turned on by depressing said erasing button.

2. The writing board as defined by claim 1, wherein said switching device is configured so that once said switching device is turned on the switching device is maintained in on state until said erasing sheet finishes one cycle of reciprocating motion.

3. The writing board with an electronic calculator as defined by claim 1, wherein at least one of said recording sheet and said electronic calculator can be titled forward.

4. A writing board on which an electronic calculator can be mounted, said board comprising:

a case member including a frame defining an opening in a top surface of said case member;

a recording sheet including a microcapsule magnetic sheet disposed in said case member with a top face of said recording sheet exposed through said opening of said case member;

a magnetic member for writing on said recording sheet;

a magnetized erasing sheet positioned under said recording sheet in parallel with said recording sheet;

an erasing button provided in said case member;

said case member being provided on said top surface a portion on which an electronic calculator can be mounted, a driving device powered by a motor and connected with said erasing sheet;

said driving device being adapted to drive said erasing sheet to produce a reciprocating movement in said erasing sheet maintaining with keeping said erasing sheet substantially in parallel with said recording sheet, from a first position wherein said erasing sheet is away enough from said recording sheet so that said erasing sheet does not magnetically affect and erase writings on said recording sheet, to a second position wherein said erasing sheet is close enough to said recording sheet so that said erasing sheet magnetically affect to erase the writings on said recording sheet;

said driving device being provided with a switching device which is adapted to be turned on by depressing said erasing button.

5. The writing board as defined by claim 4, wherein said switching device is configured so that once said switching device is turned on the switching device is maintained in on state until said erasing sheet finishes one cycle of reciprocating motion, and turned off when said erasing sheet finishes said one cycle of reciprocating motion.

6. The writing board defined by claim 4, wherein said recording sheet forwardly tiltable is adapted to tilt said recording sheet forward and/or to install said electronic calculator in tilting forward.

7. The writing board as defined by claim 4, wherein a mechanism is provided to mount said electronic calculator in a forwardly tilted state.

* * * * *